United States Patent

Fuji

[11] Patent Number: 5,971,582
[45] Date of Patent: Oct. 26, 1999

[54] METHOD FOR CONTROLLING PRINTING AND PRINTING CONTROLLING APPARATUS THEREFOR

[75] Inventor: Hisayuki Fuji, Fujisawa, Japan

[73] Assignee: Hitachi, Ltd., Tokyo, Japan

[21] Appl. No.: 08/914,197

[22] Filed: Aug. 19, 1997

[30] Foreign Application Priority Data

Aug. 20, 1996 [JP] Japan .................................. 8-218190

[51] Int. Cl.⁶ .................................................. G06F 17/00
[52] U.S. Cl. .............................................. 364/400; 101/45
[58] Field of Search ................................ 364/400; 101/45

[56] References Cited

U.S. PATENT DOCUMENTS 4,261,039  4/1981  Baker et al. ....................... 364/400 X Primary Examiner—Harold I. Pitts
Attorney, Agent, or Firm—Antonelli, Terry, Stout & Kraus, LLP

[57] ABSTRACT

An optimum printing mode, which makes total printing through-put maximum, is selected by providing control programs comprising monitoring means 4 for monitoring printing condition of the printer, comparative means 5 for determining the printing mode which makes the printing time minimum by comparing the printing mode at the moment of the printer 30 obtained by the monitoring means 4 with the printing mode of the subsequent data to be printed based on information relating to a necessary time for switching the printing mode, difference of printing time necessary for one page with respective of the printing modes each other, and the number of pages to be printed, and others, switching means 6 for switching whether the optimization of the printing mode determined by the monitoring means 4 and the comparative means 45 is performed or not and selective means 7 for selecting the printing mode based on the result determined by the comparative means 5 or setting by the switching means 6, to printing controlling portion for controlling the printer, and the printing is performed.

3 Claims, 6 Drawing Sheets

METHOD FOR CONTROLLING PRINTING AND PRINTING CONTROLLING APPARATUS THEREFOR

BACKGROUND OF THE INVENTION

The present invention relates to technology for controlling printing, particularly to technology effective by applying to controlling a printer, which has plural printing modes, for printing various printing information transmitted from a host computer.

In accordance with current change of information to increase variation and intellectual level, for instance, as described in "Nikkei Electronics" published by Nikkei BP Co. July 17, 1995, p 75~100, printers connected to computers have changed to be multifunctional, for instance, a printer capable of printing both color and monochromatic, and printing on both one plane and two planes has been practically used.

In using the multifunctional printer, conventionally, the printing mode of the printer has to be changed in accordance with printing information such as command/data, and the like, transmitted from the host computer. For instance, when printing sequence of color printing differs from that of monochromatic printing with the printer capable of both color printing and monochromatic printing, paper staying in the printer during printing operation must be removed once from the printer for changing the printing mode.

Therefore, the monochromatic printing and the color printing could not be performed continuously, and a technical problem, such as decreasing the printing efficiency by stopping the printing operation when changing the monochromatic printing with the color printing, was remained. That means, when a total through-put (the number of printed papers per unit time) is decreased by changing the printing mode, there are some cases of not so effective if the printing operation is performed with the printing mode just as instructed from the host computer. For instance, if the printing is performed in accordance with the printing mode of each of the pages sequentially when monochromatic pages and color pages must be printed continuously alternating each from other per one page, the continuous printing becomes impossible and the time necessary for printing is increased, because the operations for changing the printing mode per page and for removing paper staying in the printer are necessary.

As a countermeasure for the above case, for instance, a method for improving the through-put by dividing the printing to a printer for solely monochromatic printing and another printer for solely color printing can be considered. However, another technical problem such as increasing printing cost more than its necessity is generated, because two printers, the one is for solely monochromatic printing and the other is for solely color printing, becomes necessary, and an extra operation for dividing the printing data is required.

SUMMARY OF THE INVENTION

One of the objects of the present invention is to provide technology for controlling printing, which is capable of improving the through-put in the continuous printing operation of various printing data having different printing modes each other.

Another object of the present invention is to provide technology for controlling printing, which is capable of improving the through-put in the continuous printing operation of various printing data having different paper sizes and the number of pages each other.

Another object of the present invention is to provide technology for controlling printing, which is capable of improving the through-put in the continuous printing operation of various printing data having different printing modes each other with a low cost, without requiring exclusive printer for the respective of the printing modes.

Another object of the present invention is to provide technology for controlling printing, which is capable of improving the through-put in the continuous printing operation of various printing data having different printing modes each other, without requiring complex operation for dividing the printing data per the respective printing modes.

In accordance with the method of the present invention for controlling printing by a printer having plural printing modes, when plural printing data corresponding to respective of said printing modes are printed continuously, the printing modes is changed so that a time necessary for printing all the plural printing data becomes minimum based on a time necessary for changing the printing modes, difference in a time necessary for printing per one page of the printing data of the respective of the printing modes each other, and the number of pages of the printing data of the respective of the printing modes. In the above case, the change of the printing mode at the printer can be controlled in consideration of the present printing mode of the printer, the amount of respective printing data, and the sizes of paper whereon the printing data per the printing mode to be printed.

In accordance with the present invention, the printing controlling apparatus interposed between and linked with a printer having plural printing modes and a host computer, which controls operation of the printer based on printing information corresponding to respective of the plural printing modes transmitted from the host computer, further comprises monitoring means for monitoring the printing modes in the operation of the printer at the moment, comparative means for determining whether a time necessary for printing continuously the plural printing information by the printer becomes short or not by changing the printing mode at the moment based on comparison of the printing mode corresponding to the printing information transmitted from said host computer with the printing mode of the printer at the moment obtained from the monitoring means, and an amount of the printing information, selective means for selecting the printing mode to make the time necessary for printing minimum based on the determined result of the comparative means, and printing instructing means for instructing the printer to perform printing with the printing mode selected by the selective means.

Depending on necessity, editing means for editing the printing information transmitted from the host computer into a format of intermediate printing information in the printing controlling portion, and spreading means for spreading the format of intermediate printing information into image data can be provided.

DETAILED EXPLANATION OF THE PREFERRED EMBODIMENTS

Hereinafter, embodiments of the present invention are explained in detail referring to drawings.

Figure 1:
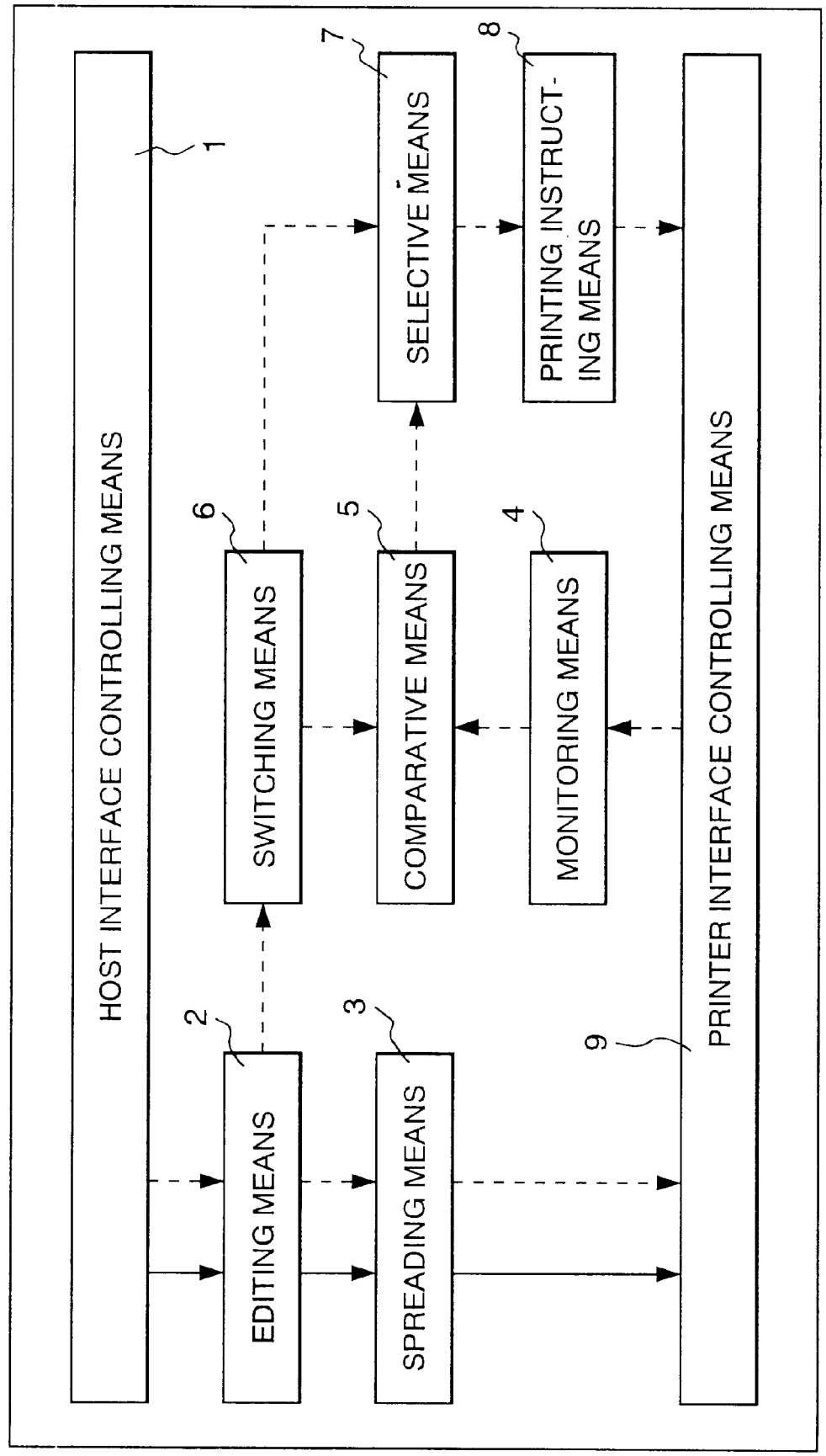
FIG. 1 is a conceptual block diagram indicating an example of composition of the control program for realizing one of the embodiments of the printing controlling method of the present invention.
Figure 2:
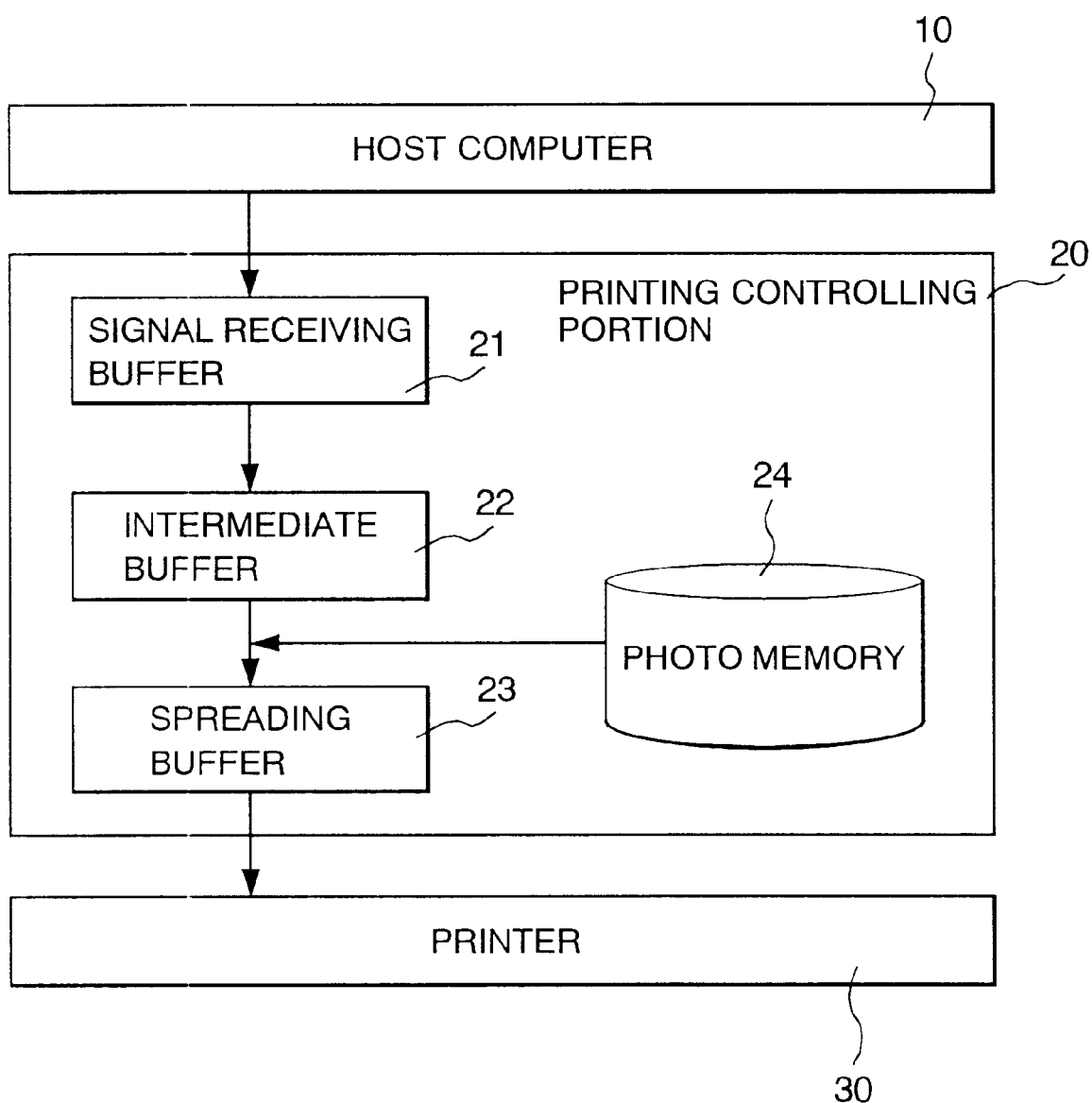
FIG. 2 is a conceptual block diagram indicating an example of composition of a printing system including one of the embodiments of the printing controlling apparatus of the present invention.
Figure 3:
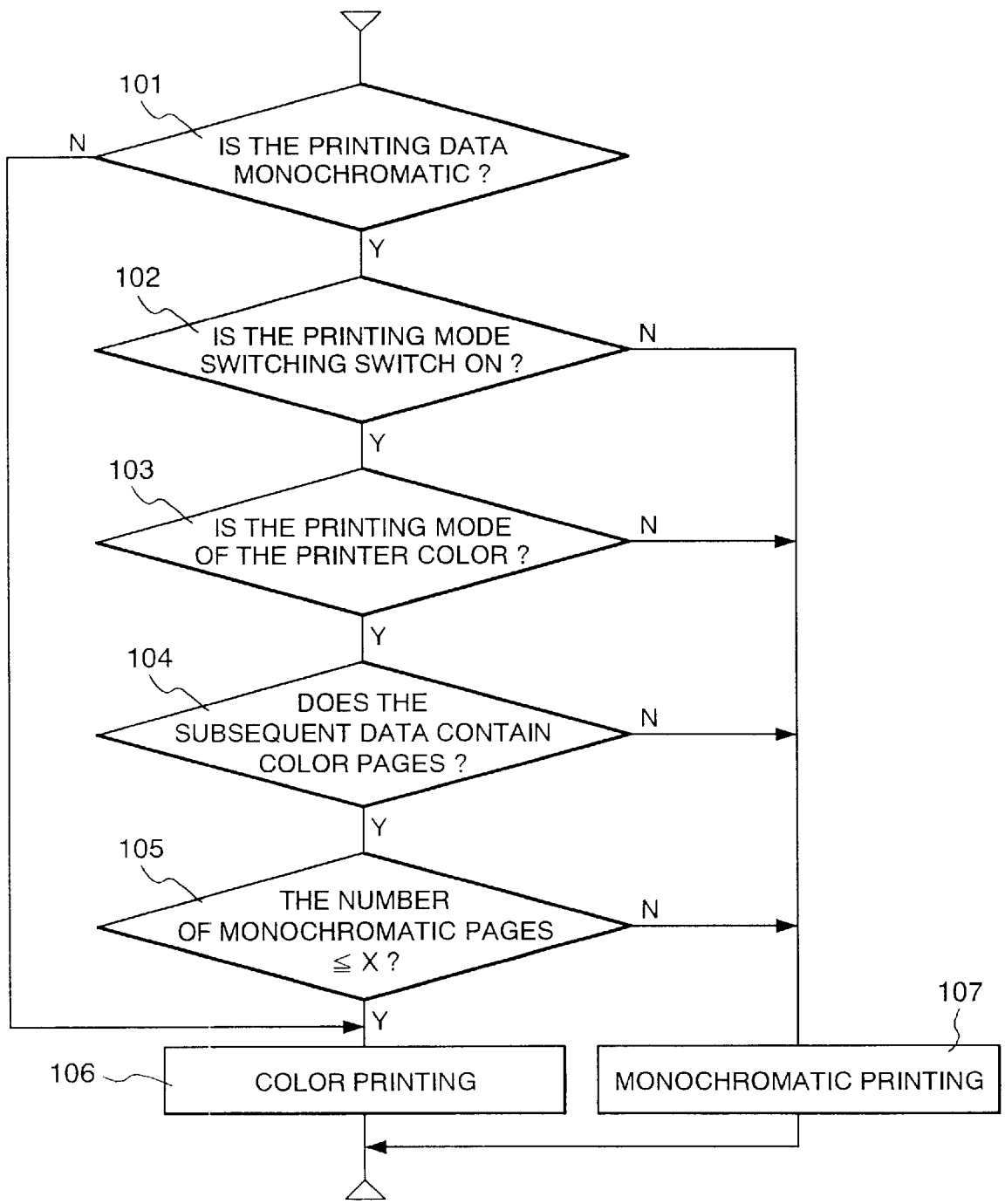
FIG. 3 is a flow chart indicating an example of functions of the printing controlling method and the printing controlling apparatus in one of the embodiments of the present invention.
Figure 4:
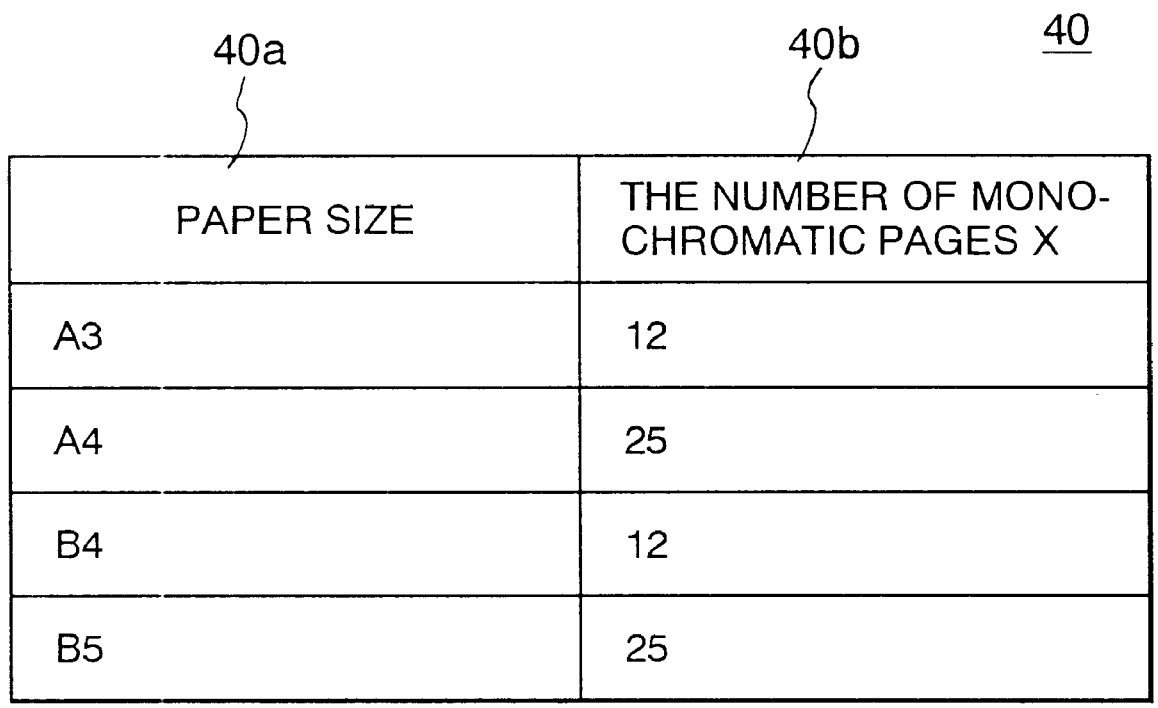
FIG. 4 is a conceptual illustration indicating an example of controlling information used in the printing controlling method and the printing controlling apparatus in one of the embodiments of the present invention.
Figure 5:
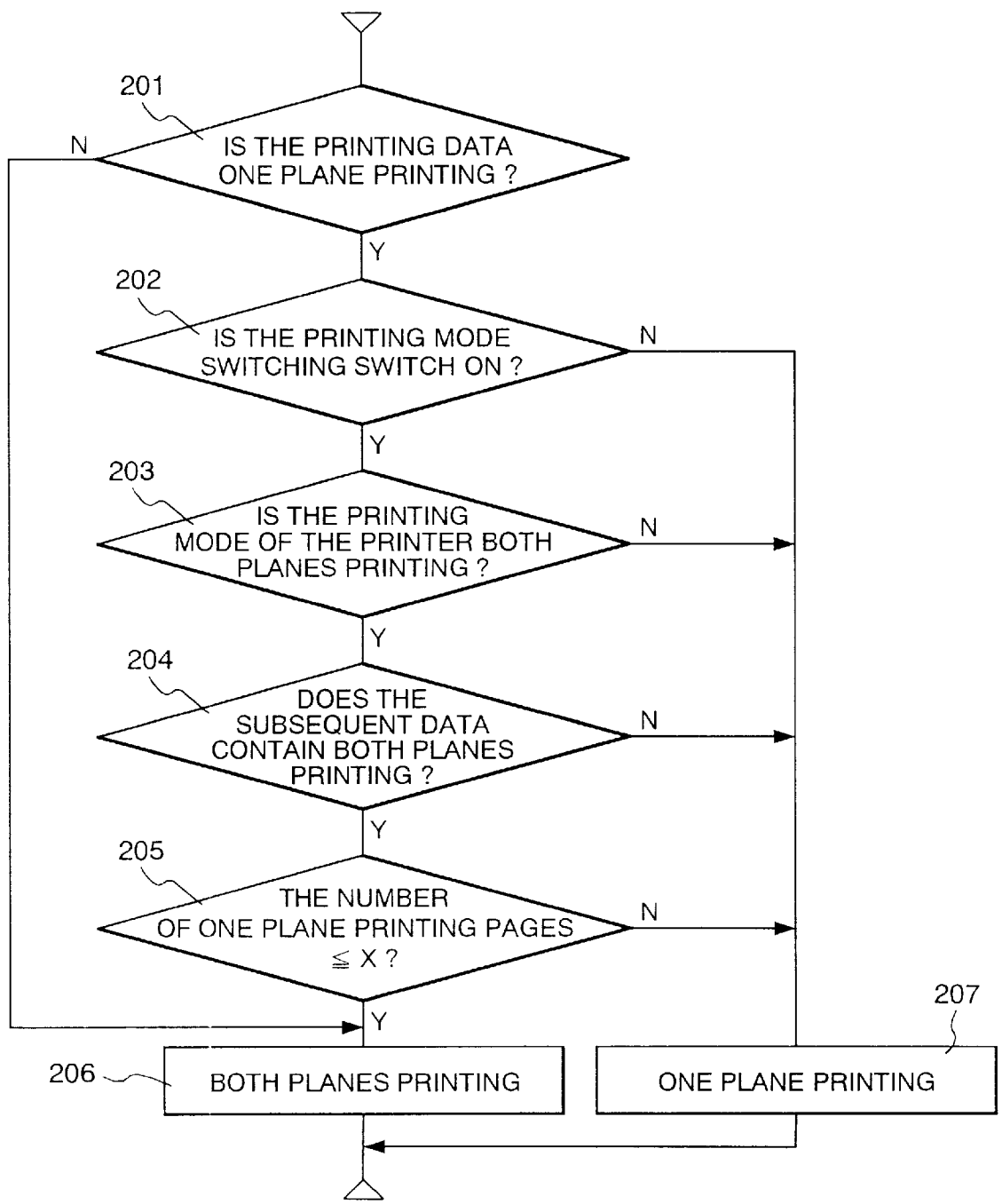
FIG. 5 is a flow chart indicating an example of functions of the printing controlling method and the printing controlling apparatus in one of the embodiments of the present invention.
Figure 6:
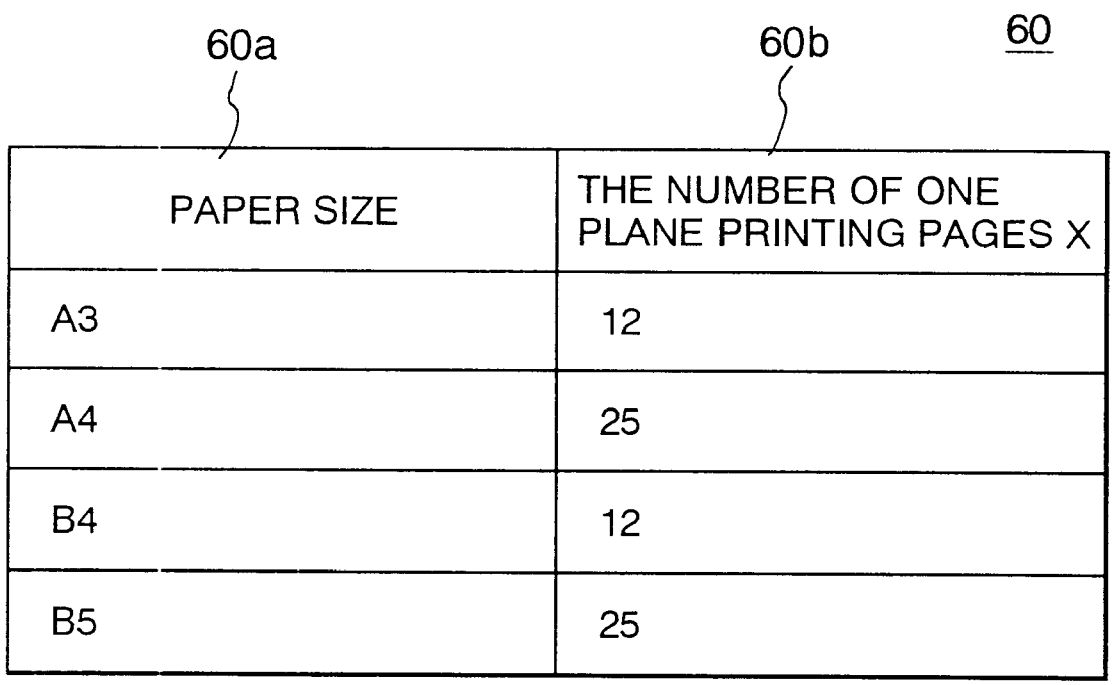
FIG. 6 is a conceptual illustration indicating an example of controlling information used in the printing controlling method and the printing controlling apparatus in one of the embodiments of the present invention.

FIG. 1 is a conceptual block diagram indicating an example of composition of the control program for realizing one of the embodiments of the printing controlling method of the present invention, FIG. 2 is a conceptual block diagram indicating an example of composition of a printing system including one of the embodiments of the printing controlling apparatus of the present invention, FIG. 3 is a flow chart indicating an example of functions of the printing controlling method and the printing controlling apparatus in one of the embodiments of the present invention, FIG. 4 is a conceptual illustration indicating an example of controlling information used in the printing controlling method and the printing controlling apparatus in one of the embodiments of the present invention, FIG. 5 is a flow chart indicating an example of functions of the printing controlling method and the printing controlling apparatus in one of the embodiments of the present invention, and FIG. 6 is a conceptual illustration indicating an example of controlling information used in the printing controlling method and the printing controlling apparatus in one of the embodiments of the present invention.

First, the composition of the printing system including the printing controlling apparatus of an embodiment of the present invention is explained referring to FIG. 2. The printing system of the present embodiment comprises a printer 30 having plural printing modes as explained later, a printing controlling portion 20 (printing controlling apparatus) for controlling the printer 30, and a host computer 10 connected to the printing controlling portion 20. The printing control portion 20 comprises a signal receiving buffer 21, an intermediate buffer 22, a spreading buffer 23, and a font memory 24.

In accordance with the printing system of the present embodiment, the signal receiving buffer 21 receives printing data and printing controlling data (printing information) transmitted from the host computer 10 in a format as they are without any change. The data accumulated in the receiving buffer 21 are translated and converted to an intermediate format so that an effective treatment in the printing controlling portion 20 becomes possible, and accumulated in the intermediate buffer 22. The intermediate data in the intermediate buffer 22 are converted with previously stored font data in the font memory 24 into bit-map-image data, and accumulated in the spreading buffer 23. After being completed the image data for one page, the image data are transmitted to the printer 30, and the data are printed by the printer 30 onto paper.

FIG. 1 indicates an example of composition of the control program at the printing controlling portion 20 in the printing system of the present embodiment. In FIG. 1, the arrows of solid line indicate flow of data, and the arrows of dotted line indicate flow of control. As indicated in FIG. 1, the control program of the present embodiment comprises host interface controlling means 1 for controlling operation for receiving printing information such as command/data and others from the host computer 10, and accumulating the information in the receiving buffer 21, editing means 2 for translating and converting the command/data in the receiving buffer 21 to the intermediate data format, spreading means 3 for converting the intermediate data to the bit-map image, monitoring means 4 for monitoring a printing condition of the printer 30, comparative means 5 for determining the printing mode which makes the printing time minimum by comparing the printing mode at the moment of the printer 30 obtained by the monitoring means 4 with the printing mode of the subsequent data to be printed, switching means 6 for switching whether the selecting operation by the printing mode of the monitoring means 4 and the comparative means 5 must be performed or not, selective means 7 for selecting the printing mode based on the result compared by the comparative means 5 and the setting by the switching means 6, printing instructing means 8 for instructing the printer 30 to print with the printing mode selected by the selective means 7, and printer interfacing means 9 for controlling receiving and transmission of the data/command from the printer 30.

The monitoring means 4 can take out the data in real time regarding the printing mode with which the printer 30 is printing at the moment. The monitoring means 4 can also adopt a method for taking out the printing mode at the moment of the printer 30 from the storing information by storing previously the printing mode instructed by the printing instructing means 8 without asking to the printer 30.

The comparative means 5 determines whether the printing time can be shortened by continuing the printing with the same printing mode of the printer 30 at the moment even though the printing mode differs, or by continuing the printing with switching the printing mode to the one exactly instructed by the command/data to be printed by comparing the printing mode of the printer 30 received from the monitoring means 4 and the printing mode instructed by the data to be printed subsequently.

The switching means 6 selects whether the printing is performed exactly in accordance with the instruction from the host computer 10, or the printing is performed effectively by changing the printing mode so as to shorten the printing time. The switching means 6 can be set by command from the host computer 10, or by a printing mode switching switch, which is provided at the printing controlling portion 20.

An example of the function of the printing controlling method and the printing controlling apparatus in the embodiment is explained referring to FIG. 3 of a flow chart and FIG. 4 of a conceptual illustration. FIG. 3 and FIG. 4 indicate an example of controlling when "color" is taken, for instance, among various printing modes. That is, this example can be applied to the printer 30 for both monochromatic and color printing. The printer 30 in this case prints the color printing data with color printing mode, and prints the monochromatic printing data with either one of the color printing mode or the monochromatic printing mode to obtain the same result.

However, switching from the color printing mode to the monochromatic printing mode, or vice versa, generates a time necessary for switching the mode on account of removing the paper, and a necessary printing time per one page of the monochromatic printing is shorter with the monochromatic printing mode than that with the color printing mode. The above difference in the necessary printing time is generated by the reason that, for instance, a case of an electrophotography, a treatment for forming electrostatic images is necessary per each of colors, and the time necessary for the treatment for forming the electrostatic images in the color printing mode is longer than that in the monochromatic mode by the number of colors.

First, the printing data transmitted from the host computer 10 is determined whether it is monochromatic or not (step 101), when it is monochromatic, the printing mode switching switch is determined whether it is in ON or not (step 102), when the printing mode changing switch is in ON, the printing mode at the moment of the printer 30 is determined whether it is for color or not (step 103), when it is for color, the subsequent printing data is determined whether it contains color data or not (step 104), when it contains color data, the necessary time for printing the subsequent printing data is compared based on the number of monochromatic pages between the color pages when the monochromatic pages are printed with the color printing mode without switching the printing mode, with the time when the monochromatic pages are printed with the monochromatic printing mode by switching the printing mode (step 105), and, if the time when the monochromatic pages are printed with the color printing mode is shorter than the time when the monochromatic pages are printed with the monochromatic printing mode, the monochromatic printing data is printed with the color printing mode at the moment (step 106).

When the printing data is determined as not the monochromatic in the step 101, the printing data is printed in color mode directly at the step 106. A case when the printing mode switching switch is determined not in ON at the step 102 subsequent to being the printing data determined as monochromatic, a case when the printing mode at the moment is not the color printing mode in the step 103, a case when the subsequent data does not contain the color printing data in the step 104, and a case when the time necessary for printing becomes shorter when the printing mode is switched to the monochromatic printing mode in the step 105, the monochromatic printing data is printed with the monochromatic printing mode by switching the printing mode (step 107).

FIG. 4 indicates an example of controlling information 40, which becomes a judging standard for determining the printing mode by the comparative means 5 (previous step 105), indicating that the maximum number of monochromatic pages which make the printing time shorter by performing the printing with the color mode than the printing time with switching to the monochromatic mode. The controlling information 40 is more exactly indicated per various sizes of the paper. In accordance with the present embodiment, the controlling information 40 is a control table containing plural sizes of paper 40a, and the number of monochromatic pages 40b (X) corresponding to each of the paper sizes. The information on the number of monochromatic pages 40b (X) is previously determined and maintained per each of the paper sizes 40a. That means, a time (tm) necessary for switching from the color printing mode to the monochromatic printing mode, and for returning from the monochromatic printing mode to the color printing mode, and difference of necessary time ($\Delta t$) for printing one page of the monochromatic data with the color printing mode and with the monochromatic printing mode is determined per each of the paper sizes. Then, a value X satisfying the equation, $tm \leq X \times \Delta t$, is determined. That is, the value of the number (X) of monochromatic pages 40b indicates that, if the monochromatic data is utmost X pages (for instance, in a case of A3 size, $X \leq 12$ pages), the printing performed with color printing mode without switching the printing mode is more advantageous in view of increasing throughput.

Next, referring to FIG. 5 and FIG. 6, an example of switching control in a case of other printing mode. FIG. 5 and FIG. 6 indicates a case regarding "printing condition (one plane printing/both planes printing)" among various printing modes. This case can be applied to a cut paper printer having functions to print onto one plane and onto both planes of the paper. The printer 30 performs the printing with both planes printing mode in case of both planes printing data. In case of one plane printing data, the same printing result can be obtained with either of the one plane printing mode and the both planes printing mode. However, switching from the both planes printing mode to the one plane printing mode, and vice versa, generates a necessary time for mode switching required for removing paper, and the necessary time for printing per one page of the one page printing data with the one plane printing mode is naturally shorter than the printing with both planes printing mode. The difference in the necessary time for printing is caused, for instance, by a longer transferring distance of the paper inside the printer 30 due to an operation for reversing the paper, and others, in case of the both planes printing than the case of the one plane printing.

First, the printing data transmitted from the host computer 10 is determined whether it is one plane printing or not (step 201), when it is one plane printing, the printing mode switching switch is determined whether it is in ON or not (step 202), when the printing mode changing switch is in ON, the printing mode at the moment of the printer 30 is determined whether it is for both planes printing mode or not (step 203), when it is the both planes printing mode, the subsequent printing data is determined whether it contains both planes printing data or not (step 204), when it contains the both planes printing data, the necessary time for printing the subsequent printing data is compared based on the number of one plane printing pages between the both planes printing pages when the one plane printing pages are printed with the both planes printing mode without switching the printing mode, with the time when the one plane printing pages are printed with the one plane printing mode by switching the printing mode (step 205), and, if it is determined that the one plane printing pages printed with the both planes printing mode is advantageous in time, the one plane printing data is printed with the both planes printing mode at the moment (step 206).

When the printing data is determined as not the one plane printing data in the step 201, but as the both panes printing data, the printing is performed with the both planes printing mode at the moment (step 206).

In the steps subsequent to the step 201, where the printing data is determined as the one plane, a case when the printing mode switching switch is determined in OFF at the step 202, a case when the printing mode at the moment is not the both planes printing mode in the step 203, a case when the subsequent data does not contain the both planes printing data in the step 204, and a case when the time necessary for printing is determined as disadvantageous when the one plane printing data is printed with the both planes printing mode in the step 205, the one plane printing data is printed with the one plane printing mode naturally by switching the printing mode (step 207).

FIG. 6 indicates an example of controlling information 60, which becomes a judging standard for determining the printing mode by the comparative means 5 (previous step 205), indicating that the maximum number of one plane printing pages which make the printing time shorter by performing the printing with the both planes mode than the printing time with switching to the one plane mode. The controlling information 60 is more exactly indicated per various sizes of the paper. In accordance with the present embodiment, the controlling information 60 is a control table containing plural sizes of paper 60a, and the number of one plane pages 60b (X) corresponding to each of the paper sizes. The information on the number of one plane pages 60b (X) is previously determined and maintained per each of the paper sizes 60a. That means, a time (tm) necessary for switching from the both planes printing mode to the one plane printing mode, and for returning from the one plane printing mode to the both planes printing mode, and difference of necessary time ($\Delta t$) for printing one page of the one plane data with the both planes printing mode and with the one plane printing mode is determined per each of the paper sizes. Then, a value X satisfying the equation, tm $\leq X \times \Delta t$, is determined. That is, the value of the number (X) of one plane pages 60b indicates that, if the one plane printing data is utmost X pages (for instance, in a case of A3 size, X=12 pages), the one plane printing performed with both planes printing mode without switching the printing mode is more advantageous.

As explained above, in accordance with the present embodiment, when the printer 30 has plural printing modes such as color printing/monochromatic printing, one plan printing/both planes printing, and soon, and furthermore, when the same printing result can be obtained even if the printing is performed with a printing mode which is not instructed by input, the total through-put can be increased in a case when various printing data having different printing modes each other is treated continuously, because an optimum printing mode is selected by determining whether the printing mode must be changed or not in order to make the through-put maximum, when the total printing through-put is decreased due to the time necessary for changing the printing mode, and others, if the printing data having different printing mode from the printing mode at the moment is transmitted from the host computer 10, and the printing is performed by simply switching the printing mode at the moment to the instructed printing mode.

Furthermore, decreasing the cost for printing can be achieved, because, for instance, providing exclusive printers for respective of the printing modes is not necessary in order to improve the through-put in treating various printing data. The through-put is also improved, because complex treatment such as classifying the printing data per each of the printing modes is not necessary.

The host computer 10 described in the present embodiment can be replaced with a work station, a personal computer, and it can be generally regarded as a higher grade apparatus. Connecting condition of the higher grade apparatus with the printing controlling portion 20 can be direct channel connection, LAN connection, SCSI connection, and the like. The printing controlling portion 20 described in the present embodiment can be provided inside the higher grade apparatus, or inside the printer 30.

Hitherto, the invention achieved by the present inventors has been explained practically based on the embodiments. However, the present invention is not restricted by the above embodiment, but it can be modified in various way within the scope of the invention.

For instance, color (color/monochromatic) and printing condition (one plane/both planes)are taken as examples in the above explanation on the embodiments of the present invention. However, the present invention can be applied to the cases other than the above printing mode, if the same printing result can be obtained by printing with another printing mode although a continuous operation becomes impossible by switching the printing mode.

In accordance with the printing controlling method of the present invention, such an advantage as improving the through-put of the continuous printing treatment for various printing data having different printing modes can be obtained.

In accordance with the printing controlling method of the present invention, such an advantage as improving the through-put of the continuous printing treatment for various printing data having different paper sizes and pages can be obtained.

In accordance with the printing controlling method of the present invention, such an advantage as improving the through-put of the continuous printing treatment for various printing data having different printing modes can be obtained with low cost and without necessitating exclusive printers per each of the printing modes.

In accordance with the printing controlling method of the present invention, such an advantage as improving the through-put of the continuous printing treatment for various printing data having different printing modes can be obtained without necessitating complex classifying treatment per each of the printing modes.

In accordance with the printing controlling apparatus of the present invention, such an advantage as improving the through-put of the continuous printing treatment for various printing data having different printing modes can be obtained.

In accordance with the printing controlling apparatus of the present invention, such an advantage as improving the through-put of the continuous printing treatment for various printing data having different paper sizes and pages can be obtained.

In accordance with the printing controlling apparatus of the present invention, such an advantage as improving the through-put of the continuous printing treatment for various printing data having different printing modes can be obtained with low cost and without necessitating exclusive printers per each of the printing modes.

In accordance with the printing controlling apparatus of the present invention, such an advantage as improving the through-put of the continuous printing treatment for various printing data having different printing modes can be obtained without necessitating complex classifying treatment per each of the printing modes.

I claim:

1. A method for controlling printing by a printer having plural printing modes, wherein, when plural printing data corresponding to respective of said printing modes are printed continuously, said printing mode is selected so that a time necessary for printing said plural printing data becomes minimum based on a time necessary for changing said printing modes, difference in a time necessary for printing per one page of said printing data of the respective of said printing modes each other, and the number of pages of said printing data of the respective of said printing modes.

2. A method for controlling printing as claimed in claim 1, said difference in the time necessary for printing per one page of said printing data of the respective of said printing modes each other is determined per respective of different paper sizes, and selection of said printing mode at said printer is controlled in consideration of the paper size whereon said printing data to be printed.

3. A printing controlling apparatus interposed between and linked with a printer having plural printing modes and a host computer, which controls operation of said printer based on printing information corresponding to respective of said plural printing modes transmitted from said host computer, further comprises monitoring means for monitoring said printing modes of said printer operating at the moment, comparative means for determining whether a time necessary for continuous printing of said plural printing information becomes short or not by changing the printing mode at the moment based on comparison of said printing mode corresponding to said printing information transmitted from said host computer with the printing mode of said printer at the moment obtained from said monitoring means, and an amount of said printing information, a selective means for selecting said printing mode to make the time necessary for printing minimum based on the determined result of said comparative means, and printing instructing means for instructing said printer to perform printing with said printing mode selected by said selective means.

* * * * *